Nov. 18, 1958 J. I. PANKOVE 2,861,229

SEMI-CONDUCTOR DEVICES AND METHODS OF MAKING SAME

Filed June 19, 1953

INVENTOR.
Jacques I. Pankove

BY J. L. Whittaker
ATTORNEY

United States Patent Office 2,861,229 Patented Nov. 18, 1958

2,861,229

SEMI-CONDUCTOR DEVICES AND METHODS OF MAKING SAME

Jacques I. Pankove, Princeton, N. J., assignor to Radio Corporation of America, a corporation of Delaware Application June 19, 1953, Serial No. 362,748

12 Claims. (Cl. 317—235)

This invention relates broadly to semi-conductor devices and methods of making them and more particularly to alloy junction devices having a pair of closely adjacent P–N rectifying junctions as in a hook-type electrode.

It is known to make semi-conductor devices having hook-type electrodes. A hook-type electrode comprises a pair of closely spaced substantially parallel P–N rectifying junctions. The theory and advantages of devices having such electrodes are discussed in an article by W. Shockley et al. entitled "P–N Junction Transistors" in the Physical Review for July 1, 1951, volume 83 at page 156. A transistor having a hook collector electrode and a method of making it is described in U. S. Patent 2,623,105 issued December 23, 1952, W. Shockley et al. entitled "Semi-Conductor Translating Device Having Controlled Gain."

An important feature of a hook-type electrode is the space charge effect produced between the pair of P–N rectifying junctions in the electrode. This space charge makes possible a large current gain in a device employing a hook electrode. To a large extent, the advantages of a hook electrode are dependent upon the closeness of the spacing between the two rectifying junctions.

Previous devices having hook electrodes have been made by cutting off selected portions of a grown crystal that contains a plurality of spaced P–N rectifying junctions. This method is subject to several disadvantages particularly in the difficulty of selecting a suitable portion of the grown crystal, in accurately cutting it off, and in making electrical connections to it.

In accordance with the present invention an improved method of making semi-conductor devices including hook-type electrodes utilizes the alloy diffusion technique of making P–N junctions. The improved methods and devices made thereby do not have most of the manufacturing disadvantages of the previously used methods. The new method also results in the production of improved devices having more readily accessible P–N junction regions.

Accordingly it is an object of the present invention to provide an improved semi-conductor device.

Another object is to provide an improved method of making a semi-conductor device having two P–N rectifying junctions associated with one electrode thereof.

Another object is to provide a semi-conductor device having an improved hook-type electrode.

Another object is to provide an improved photo-conductor device utilizing a semi-conductive germanium body having a hook-type electrode.

Another object is to provide an improved method of making a semi-conductor device having a hook-type electrode.

A still further object of the invention is to provide a novel method of making photo-electric devices utilizing semi-conductive germanium.

These and other objects may be accomplished in accordance with the present invention wherein a plurality of P–N rectifying junctions associated with a single electrode may be produced within a semi-conductor body by the alloy diffusion technique. Broadly the invention comprises fusing two opposite conductivity type-determining impurity-yielding materials successively upon the same surface of a semi-conductive body having one type of conductivity. The invention may be more readily understood by reference to the following detailed description and to the drawing of which:

Similar reference characters are applied to similar elements throughout the drawing.

Figures 1, 2, 3, 4, 5, 6, 7, 8, 9, 10, 11, 12, 13, 14:
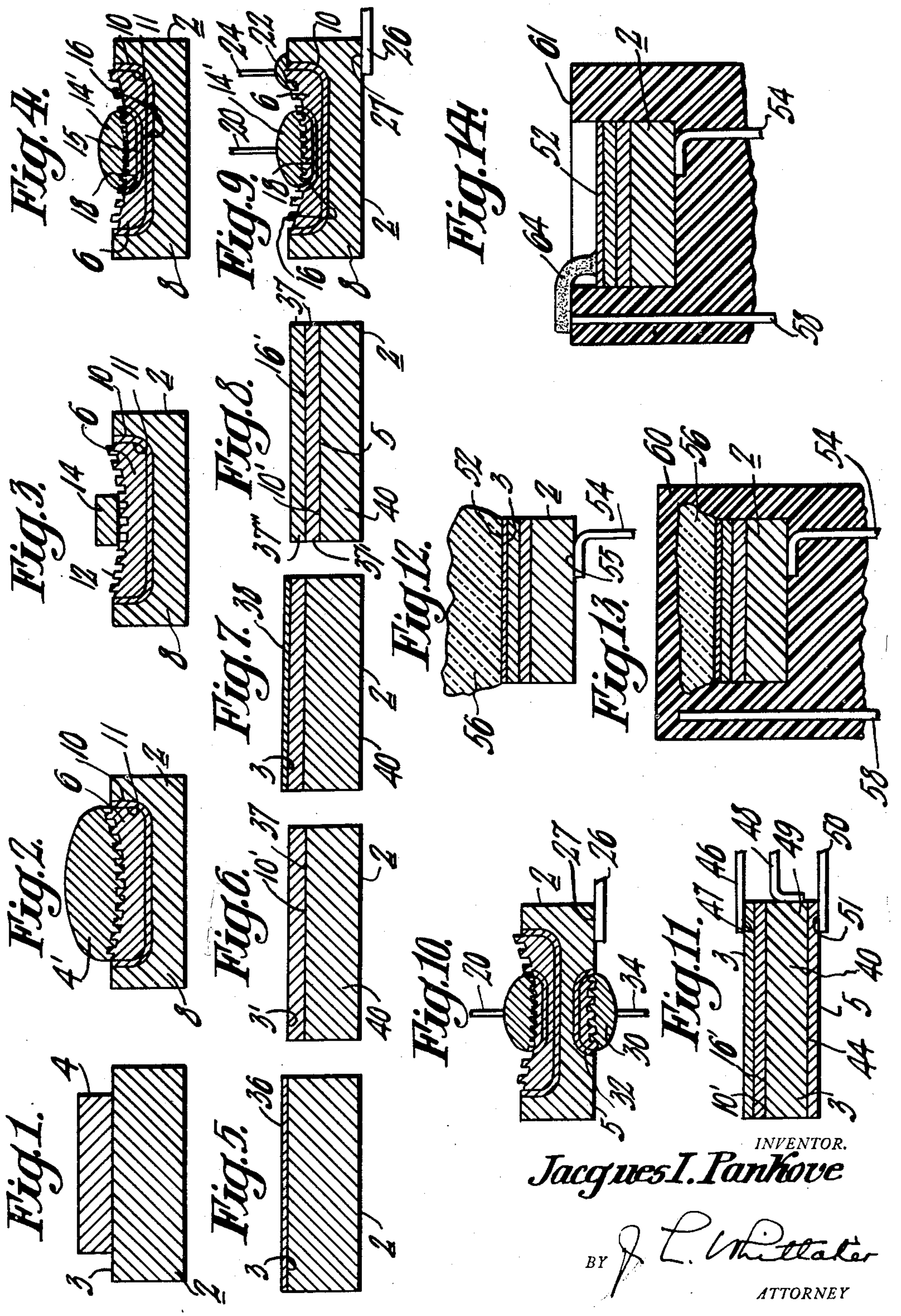
Figures 1–4 are schematic, cross-sectional, elevational views of a semi-conductive body illustrating steps of the method according to one embodiment of the invention.
Figures 5–8 are schematic, cross-sectional, elevational views of a semi-conductor body illustrating steps of a method according to a preferred embodiment of the instant invention.
Figures 9–11 are schematic, cross-sectional, elevational views of various devices produced according to the invention.
Figures 12–14 are schematic, cross-sectional, elevational views of the semi-conductor body of Figure 8 being treated to form a photo-conductor device.

The production of a hook-type electrode according to one embodiment of the instant invention is illustrated in Figures 1–4. Figure 1 shows a wafer 2 of N-type semi-conductive germanium about 0.25" x 0.25" x .01" in size. A disc 4 of indium about .05" in diameter and .005" thick rests upon one surface 3 of the germanium wafer. The wafer and the disc are heated together at about 500° C. for about four minutes in a non-oxidizing atmosphere to form the device shown in Figure 2. The heating melts the indium and causes it to alloy with and to diffuse into the germanium wafer, thereby forming the P–N rectifying junction 10.

The device formed by this process comprises the germanium wafer 2 having an N-type semi-conductive region 8, a P-type semi-conductive recrystallized region 6 and a P–N rectifying junction 10 disposed between these two regions. The line 11 represents the alloy front, the surface of maximum penetration of the molten indium into the wafer during firing. The indium disc has become fused to the germanium wafer to form an electrode 4'.

It is believed that diffusion of indium, or other impurity-yielding material, occurs in the wafer beyond the alloy front, and that the P–N rectifying junction is formed deeper in the wafer than the alloy front. However, this is not definitely known, but it appears well established that the junction is formed within a distance of about 1 micron from the alloy front.

The indium electrode 4' is removed from the wafer by any known method such as etching in concentrated hydrochloric acid. More conveniently, the indium may be removed by the method described in my co-pending application, Serial No. 339,683, filed March 2, 1953, now Patent No. 2,823,148, entitled "Semi-Conductor Devices and Methods for Making Same." This method comprises, briefly, dissolving the indium in mercury and rinsing the exposed recrystallized surface in nitric acid.

After removal of the indium the device may be etched for about one minute in a mixture of nitric and hydrofluoric acids to remove a portion of the recrystallized region. This step is not essential but may be desirable in order to minimize the spacing between the pair of P–N junctions to be produced.

As illustrated in Figure 3 a pellet or disc 14 comprising an alloy of 90% lead and 10% antimony is placed upon the exposed recrystallized surface 12 and heated at about 600° C. for about five minutes in a non-oxidizing atmosphere to form a hook-type electrode shown in Figure 4.

The hook electrode formed thus, according to the practice of the instant invention, comprises in adjacent sequence a region 14' of ohmic conductivity comprising a lead antimony alloy, a twice recrystallized region 18 of semi-conductive germanium having N-type conductivity, an alloy front 15, a first P–N rectifying junction 16, a recrystallized region 6 of P-type semi-conductive germanium, a second alloy front 11 and a second P–N rectifying junction 10. An essential feature of the instant invention is the pair of closely spaced P–N rectifying junctions 10 and 16.

A hook electrode formed according to the embodiment of the invention described heretofore may be utilized to form the devices illustrated in Figures 9 and 10. Figure 9 illustrates the utilization of the device shown in Figure 4 as a high frequency transistor.

In this embodiment the hook characteristic is not exploited, but advantage is taken of the close spacing between the two P–N rectifying junctions and of the relatively low resistivity of the recrystallized region of the wafer. Such close spacing and relatively low resistivity are desirable since they permit operation of a transistor at relatively high frequencies.

To form a transistor utilizing the device shown in Figure 4, an electrical lead 20 is soldered or welded to the lead-antimony electrode 14'. A small pellet 22 of indium is fused both to the recrystallized region 6 and to an electrical lead 24. It is immaterial whether or not the indium pellet 22 is restricted to contact the recrystallized region only or overlaps and also becomes fused to the N-type semi-conductive region 8 of the germanium wafer. If the indium pellet does overlap and fuse to the N-type semi-conductive region 8, the principal resulting effect is merely to distort somewhat the periphery of the P–N rectifying junction 10.

A metal tab or wire 26 having a tinned surface 27 is fused to the region 8 of the germanium wafer to form a non-rectifying contact therewith. The device may then be conventionally etched, mounted and potted. When employed in a circuit the recrystallized region 6 may be utilized as a base, the electrode 14' as an emitter, and the N-type semi-conductive region 8 as a collector.

Another device that may be conveniently formed in connection with the embodiment of the invention described heretofore is illustrated in Figure 10. This device comprises the device of Figure 4 with the addition of an emitter electrode 30 disposed upon the opposite side 5 of the germanium wafer, and a base tab 26 attached to the wafer by means of a non-rectifying solder connection 27. The emitter electrode is formed in a manner exactly similar to the forming of the electrode described in connection with Figure 2. A relatively small pellet or disc of indium is placed in contact with the surface 5 of the germanium wafer and heated at about 500° C. for about five minutes to form the emitter electrode 30 and the P–N rectifying junction 32. Electrical leads 20 and 34 are attached to the respective electrodes. The device may be conventionally etched, mounted and potted and may be advantageously employed in a circuit as a hook-type transistor.

A preferred embodiment of the invention comprises a method generally similar to the method described heretofore but subject to a greater degree of control. This method is illustrated in Figures 5–8.

Figure 5 shows a wafer 2 of P-type semi-conductive germanium bearing a relatively thin film 36, about 1000–5000 Angstroms thick, of antimony upon a surface 3 thereof. The wafer may be of any convenient size such as .25" x .25" x .005". The film may be applied by any convenient means such as electroplating or evaporating in vacuo according to known techniques. The wafer is heated at about 800° to 900° C. for about ten minutes to cause the antimony to diffuse into the wafer and to change the conductivity type of a region 37 adjacent the surface 3 from P-type to N-type and to form the P–N rectifying junction 10' between the changed region 37 and the remainder 40 of the wafer.

A film of indium 38 about 1000–5000 Angstroms thick is then evaporated upon the surface 3' of the region 37 of the wafer. The wafer is again heated at about 900° C. for about ten minutes to diffuse the indium into the wafer, thereby to change the conductivity type of a portion 37'' of the region 37. During this heating step, while the indium is diffusing into the wafer, the antimony continues to diffuse deeper into the wafer, thus enlarging to some extent at least the region 37 and extending the junction 10' deeper into the wafer. The indium does not diffuse deeply enough to change the conductivity type of the entire region 37, but there remains a portion 37' of the region still having a conductivity type principally determined by the diffused antimony.

There is thus formed a semi-conductor body having two closely adjacent P–N rectifying junctions. One junction 16' lies between the two portions 37'' and 37' of the region 37. The second junction 10' lies between the region 37 and the remainder 40 of the wafer. This body may be conveniently utilized in the devices illustrated in Figures 11 and 12–14.

Figure 11 illustrates a hook-type transistor formed in accordance with the preferred embodiment of the instant invention. Upon the surface 5 of the wafer shown in Figure 8 there is evaporated or electroplated a thin film of antimony about 1000–5000 Angstroms thick. The wafer is heated as described heretofore at about 800° to 900° C. for about ten minutes to diffuse antimony into the body and to form the emitter P–N rectifying junction 44. Electrical leads 46, 48 and 50 are attached by non-rectifying solder connections 47, 49 and 51 to respective portions of the wafer. The electrical lead 46 is attached to the surface 3 of the wafer which may be advantageously utilized in a circuit as a hook collector electrode. The lead 48 is connected to the base region 40 of the wafer. The base region is that portion of the wafer disposed between the P–N junction 10' of the hook electrode and the emitter P–N rectifying junction 44. The electrical lead 50 is connected to the surface 5 of the wafer.

The semi-conductor body shown in Figure 8 may also be advantageously utilized to form a photo-conductor device as illustrated in Figures 12–14. In Figure 12 there is shown the wafer 2 as described in connection with Figure 8. Upon the surface 3 there is evaporated or plated a relatively thin semi-transparent film 52 of a highly conductive metal such as gold. This film serves principally to make a uniform electrical connection to and to increase the conductivity of the surface 3 and may conveniently be about 500 Angstroms thick. An electrical lead 54 is connected to the opposite surface 5 of the wafer by a non-rectifying solder connection 55. A layer 56 of a wax or other insulating material soluble in any convenient solvent such as acetone or alcohol is placed upon the gold film.

As shown in Figure 13 the assembly just described, along with a separate electrical lead 58, is embedded in an insulating hardenable plastic material 60. The plastic is hardened so that the wafer and the electrical leads are rigidly fixed in position. A portion of the resin is ground or cut away to expose the wax coating and the electrical lead 58. The wax is removed by dissolving it in a suitable solvent such as alcohol or acetone. Referring now to Figure 14, a relatively small quantity of a conductive paste 64 such as a silver paste or platinum paste is spread across the newly exposed surface 61 of the resin to contact the electrical lead 58 and a portion of the gold film 52. There is thus established an electrical connection between the leads 58 and 54 through the silver paste, the gold film and the wafer to form a photo device having an exceptionally high sensitivity to light.

Previous photocells utilizing P–N rectifying junctions have been described in which the photo-sensitive regions comprise only peripheral portions of the P–N rectifying junctions. In the instant device, however, greatly increased sensitivity is obtained since substantially the entire P–N junction region is exposed to the effect of light through the gold film and the relatively thin layer of germanium between the film and the junction.

A similar photocell may also be produced according to the first described embodiment of the instant invention. Such a device may be produced by first removing the electrode 14′ of the wafer shown in Figure 4 and then treating the wafer in a manner similar to that described in connection with the device of Figure 14. The electrode 14′ may readily be removed by dissolving it in mercury in a manner similar to that described in connection with the removal of the electrode 4′ shown in Figure 2.

It should be understood that the practice of the invention is not limited to the exact devices nor to the materials described heretofore but is equally applicable to different devices and to devices made of other materials. For example silicon may be used to form a base wafer, and materials other than indium and a lead-antimony alloy may be used as electrode materials. Zinc, cadmium, gallium, aluminum, arsenic and phosphorus are examples of materials that also may be employed as electrode materials.

The conductivity types of the various parts of the devices heretofore described also may be varied. For example N-type material may be substituted for P-type material in a device, provided only that a complete substitution is made, N for P, and P for N in every essential part of the device.

In order to avoid excessively complicated terminology, use is made herein of a convention for denoting the conductivity type effect of impurities in semiconductors. This convention comprises terming any given impurity material as being of a given type, N or P, whereas a complete description of the material would include a statement to the effect that the material is capable of imparting a specified type of conductivity to the semi-conductor body of reference. An N-type impurity, or impurity material therefore when spoken of with respect to germanium or silicon means an impurity which is capable of imparting N-type conductivity to germanium or silicon when dispersed therein.

It should be understood that the times and temperatures used in the methods of the instant invention are not critical, but may be varied within the general limits applicable to the fabrication of other semi-conductor devices. In particular, the time and temperature of heating in different instances may depend to some extent upon the diffusion coefficients and the melting points of the materials employed. In general, a relatively high temperature or a relatively long time of heating, or both, may be used when the materials of the device have relatively high melting points or relatively low diffusion rates.

An essential feature of the invention is the production of two relatively closely spaced P–N rectifying junctions within a semi-conductor body by alloying, diffusing or alloying and diffusing two opposite conductivity type-determining impurity-yielding materials successively into the same surface of the body. The method illustrated by Figures 1–4 comprises the practice of the instant invention utilizing the conventional alloy-diffusion technique. The method illustrated by Figures 5–8 differs from the conventional alloy-diffusion method in that the quantity of impurity-yielding material employed is so small that the process may conveniently be considered as accomplished by diffusion alone. However, the two processes are closely related. They both comprise placing an impurity-yielding material upon the surface of a semi-conductor body and heating the material and the body together to form a P–N rectifying junction within the body.

In the production of a photocell according to the instant invention the conductive layer that is evaporated or plated upon the semi-conductor body need not be of gold as described in connection with Figure 14. This conductive film may be of any highly conductive material that is at least semi-transparent when in the form of a relatively thin film. With somewhat less satisfactory results, because of the relatively low conductivity of the semi-conductor wafer, the conductive film may be omitted. It is preferred, however, in order to increase the sensitivity of the device to employ a conductive film. It is also preferred to make the film of a metal such as gold, nickel, silver or platinum in order to minimize any difficulties that may arise through corrosion.

There have thus been described improved methods for making hook-type semi-conductor devices and other devices employing a pair of relatively closely spaced P–N rectifying junctions. Devices made thereby have also been described, particularly transistors especially suitable for high frequency applications, transistors especially suitable for high current gain applications, and photo-sensitive devices.

What is claimed is:

1. The method of making a semiconductor device comprising heating a body of a first impurity material in contact with a semi-conductor body to alloy a portion of said first material into said semi-conductor body and to form a P–N rectifying junction therein, removing all other portions of said material from said body to expose a surface thereof, and heating a body of a second impurity material in contact with said exposed surface thereby to alloy a portion of said second material into said body and to form a second P–N rectifying junction therein.

2. The method of making a semiconductor device comprising placing a film of a first impurity material upon a surface of a semi-conductor body, heating said body to cause said film to diffuse into said body thereby to form a first P–N rectifying junction therein, placing a film of a second impurity material upon said surface, and heating said body to cause said film of said second material to diffuse into said body thereby to form a second P–N rectifying junction therein.

3. The method according to claim 2 in which said films are placed upon said surface by evaporating said impurity materials in vacuo, and said semiconductor is of N-type semiconductive germanium.

4. The method according to claim 2 in which said films are placed upon said surface by electroplating, and said semiconductor is of N-type semiconductive germanium.

5. A semi-conductor device comprising a semi-conductor body having a major relatively high resistivity region of one conductivity type, an adjacent relatively low resistivity region of opposite conductivity type, a second relatively low resistivity region of said one conductivity type spaced from said major region, a body of an impurity material of said one conductivity type fused to said second region, a first P–N rectifying junction disposed between said adjacent region and said second region, and a second P–N rectifying junction disposed between said major region and said adjacent region.

6. A photo-conductor device comprising a semiconductor body having a pair of spaced P–N rectifying junctions therein adjacent one surface thereof, substantially the entire area of one of said junctions being parallel to said surface and spaced within light-effecting distance from said surface, in which said surface bears a semi-transparent film of a conductive metal.

7. A photo-conductor device comprising a semiconductor body having a pair of spaced P–N rectifying junctions therein adjacent one surface thereof, substantially the entire area of one of said junctions being parallel to said surface and spaced within light-effecting distance from said surface, in which said surface bears a semi-transparent film of gold.

8. A method of making a high frequency transistor having two closely spaced P–N rectifying junctions, comprising the steps of heating a pellet of a first electrode material in contact with a semiconductor wafer to alloy a portion of said first electrode material into a portion of said semiconductor wafer and to form a P–N rectifying junction therein, removing all other portions of said material from said wafer to expose a surface thereof, heating a pellet of a second electrode material in contact with said exposed surface thereby to alloy a portion of said second material into said wafer and form a second P–N rectifying junction therein close to said first rectifying junction, attaching an electrical lead to said second electrode, attaching an electrical lead to said portion of said wafer alloyed with said first electrode material, and attaching a non-rectifying connection to said wafer.

9. A high frequency transistor comprising a monocrystalline semiconductive wafer of given conductivity type, a first region of said wafer adjacent one surface being alloyed with a first impurity inducing opposite conductivity type, said first region serving as the base region, a second region of said wafer on said one surface adjacent said first region, said second region being alloyed with a second impurity inducing said given conductivity type, said second region serving as the emitter region, an ohmic base connection to the wafer surface opposite said one surface, and electrical connections to said emitter region and said base region.

10. A method of making a hook transistor comprising the steps of heating a pellet of a first electrode material in contact with one side of a semiconductor wafer to alloy a portion of said first material into a portion of said semiconductor wafer and to form a P–N rectifying junction therein, removing all other portions of said first material from said wafer to expose a surface thereof, heating a pellet of a second electrode material in contact with said exposed surface thereby to alloy a portion of said second material into said wafer and form a second P–N rectifying junction therein close to said first rectifying junction, alloying another pellet of said first electrode material to the opposite side of said wafer, attaching a nonrectifying connection to said wafer, and attaching electrical leads to said electrodes on said opposite sides of said wafer.

11. A hook transistor comprising a mononcrystalline semiconductive wafer of given conductivity type, a first region of said wafer adjacent one surface being alloyed with a first impurity inducing opposite conductivity type, a second region of said wafer on said one surface adjacent said first region, said second region being alloyed with a second impurity inducing said given conductivity type, said second region serving as the collector region, an emitter comprising a rectifying electrode alloyed to the opposite surface of said wafer, an ohmic base connection to the wafer surface opposite said one surface, and electrical leads to said collector region, said emitter, and said base connection.

12. A method of making a photo-conductive device comprising the steps of heating a first pellet of a first electrode material in contact with a semiconductor wafer to alloy a portion of said first impurity material into a portion of said semiconductor wafer and to form a rectifying P–N junction therein, removing all other portions of said material from said wafer to expose a surface thereof, heating a second pellet of a second electrode material in contact with said exposed surface thereby to alloy a portion of said second material into said exposed surface, removing all other portions of said second material from said wafer, evaporating on said exposed surface a thin semi-transparent metal film, attaching a portion of said film to an electrical lead and attaching an electrical lead to the wafer surface opposite said exposed surface.

References Cited in the file of this patent

UNITED STATES PATENTS

| | | |
|---|---|---|
| 2,402,662 | Ohl | June 25, 1946 |
| 2,524,035 | Bardeen | Oct. 3, 1950 |
| 2,561,411 | Pfann | July 24, 1951 |
| 2,597,028 | Pfann | May 20, 1952 |
| 2,666,814 | Shockley | Jan. 19, 1954 |
| 2,725,315 | Fuller | Nov. 29, 1955 |
| 2,740,076 | Mathews et al. | Mar. 27, 1956 |
| 2,767,358 | Early | Oct. 16, 1956 |